United States Patent
Fukunaga

(10) Patent No.: US 11,201,518 B2
(45) Date of Patent: Dec. 14, 2021

(54) STATOR CORE INCLUDING RECESSED PORTION, PROJECTING PORTION, AND WELDED PORTION, AND MOTOR INCLUDING SAME

(71) Applicant: Nidec Corporation, Kyoto (JP)

(72) Inventor: Keisuke Fukunaga, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 222 days.

(21) Appl. No.: 16/574,203

(22) Filed: Sep. 18, 2019

(65) Prior Publication Data

US 2020/0127522 A1    Apr. 23, 2020

(30) Foreign Application Priority Data

Oct. 17, 2018    (JP) .............................. JP2018-196062

(51) Int. Cl.
| | |
|---|---|
| *H02K 1/18* | (2006.01) |
| *H02K 3/42* | (2006.01) |
| *H02K 1/14* | (2006.01) |
| *H02K 1/08* | (2006.01) |

(52) U.S. Cl.
CPC .............. *H02K 3/42* (2013.01); *H02K 1/08* (2013.01); *H02K 1/14* (2013.01); *H02K 2201/09* (2013.01)

(58) Field of Classification Search
CPC ...... H02K 3/42; H02K 15/028; H02K 15/024; H02K 2201/09; H02K 1/08; H02K 1/14; H02K 1/146; H02K 1/18; H02K 1/185; H02K 1/04; H02K 1/16; H02K 2213/03
USPC ........... 310/179, 216.049, 216.057, 216.058, 310/216.048
See application file for complete search history.

(56) References Cited

U.S. PATENT DOCUMENTS

| | | | | |
|---|---|---|---|---|
| 2,448,785 | A | * | 9/1948 | Dolan ...................... H02K 1/16 428/575 |
| 2,774,001 | A | * | 12/1956 | Riedel ...................... H02K 1/16 310/216.136 |
| 5,168,662 | A | * | 12/1992 | Nakamura ............... H02K 1/04 174/DIG. 20 |
| 2008/0111443 | A1 | | 5/2008 | Okamoto et al. |
| 2013/0043758 | A1 | * | 2/2013 | Elson ...................... H02K 3/522 310/180 |

FOREIGN PATENT DOCUMENTS

| | | |
|---|---|---|
| JP | 3-97352 U | 10/1991 |
| JP | 2007-159300 A | 6/2007 |
| JP | 2007159300 A * | 6/2007 |

OTHER PUBLICATIONS

Machine translation of JP-2007159300-A. (Year: 2007).*

* cited by examiner

*Primary Examiner* — Michael Andrews
(74) *Attorney, Agent, or Firm* — Keating & Bennett

(57) ABSTRACT

A stator core includes plate-shaped core members laminated to define the stator core. Each core member includes an annular core back portion, and tooth portions that project radially inward from an inner circumferential surface of the core back portion. The core back portion includes at least one recessed portion recessed radially inward from an outer circumferential surface of the core back portion, and at least one welded portion arranged at a corresponding one of the at least one recessed portion to join axially adjacent ones of the core members. The at least one recessed portion is recessed in a radial direction is in a range of about 0.2 mm to about 1.5 mm, both inclusive.

14 Claims, 4 Drawing Sheets

STATOR CORE INCLUDING RECESSED PORTION, PROJECTING PORTION, AND WELDED PORTION, AND MOTOR INCLUDING SAME

CROSS REFERENCE TO RELATED APPLICATION

The present invention claims priority under 35 U.S.C. § 119 to Japanese Application No. 2018-196062 filed on Oct. 17, 2018, the entire contents of which are hereby incorporated herein by reference.

1. FIELD OF THE INVENTION

The present disclosure relates to a stator core and a motor.

2. BACKGROUND

A known stator core is defined by a plurality of annular electromagnetic steel sheets laminated. Axially adjacent ones of the electromagnetic steel sheets are joined together by welding into a unit. The welding is performed on welding portions arranged on outer circumferential surfaces of the electromagnetic steel sheets.

The stator core includes a plurality of tooth portions arranged to project radially inward. A conducting wire is wound around each tooth portion to define a coil around the tooth portion. Once an electric drive current is passed through the conducting wire, a magnetic field is generated around the coil. At this time, magnetic lines of flux generated in the coil travel radially outward through the tooth portion, and travel in a circumferential direction in an outer circumferential portion of the stator core. The magnetic lines of flux traveling in the circumferential direction then travel radially inward through adjacent ones of the tooth portions.

However, in the above known stator core, the welding portions protrude radially outward from an outer circumferential surface of the stator core. Accordingly, some of the magnetic lines of flux traveling in the circumferential direction in the outer circumferential portion of the stator core may sometimes escape to a structure arranged outside of the stator core through the welding portions. This may lead to a magnetic flux loss.

SUMMARY

A stator core according to an example embodiment of the present disclosure includes a plurality of plate-shaped core members laminated to define the stator core. Each core member includes an annular core back portion, and a plurality of tooth portions that project radially inward from an inner circumferential surface of the core back portion. Each of the core back portions includes at least one recessed portion recessed radially inward from an outer circumferential surface of the core back portion, and at least one welded portion arranged at a corresponding one of the at least one recessed portion to join axially adjacent ones of the core members. The at least one recessed portion is recessed in a radial direction in a range of about 0.2 mm to about 1.5 mm, both inclusive.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described in detail with reference to the accompanying drawings. It is assumed herein that an upper side and a lower side along a central axis of a motor are referred to simply as an upper side and a lower side, respectively. It should be noted, however, that the above definition of the upper and lower sides is not meant to indicate relative positions or directions of different members or portions when those members or portions are actually installed in a device. It is also assumed herein that directions parallel to or substantially parallel to the central axis are referred to by the term "axial direction", "axial", or "axially", that radial directions centered on the central axis are simply referred to by the term "radial direction", "radial", or "radially", and that a circumferential direction about the central axis is referred to by the term "circumferential direction", "circumferential", or "circumferentially". It is also assumed herein that an axial direction is a vertical direction, and that a side on which a top plate portion 11b is arranged with respect to a bottom plate portion 11a is an upper side, and the shape of each member or portion and relative positions of different members or portions will be described based on the above assumptions. It should be noted, however, that the above definition of the vertical direction and the upper and lower sides is made simply for the sake of convenience in description, and is not meant to restrict actual relative positions or actual directions.

Figure 1:
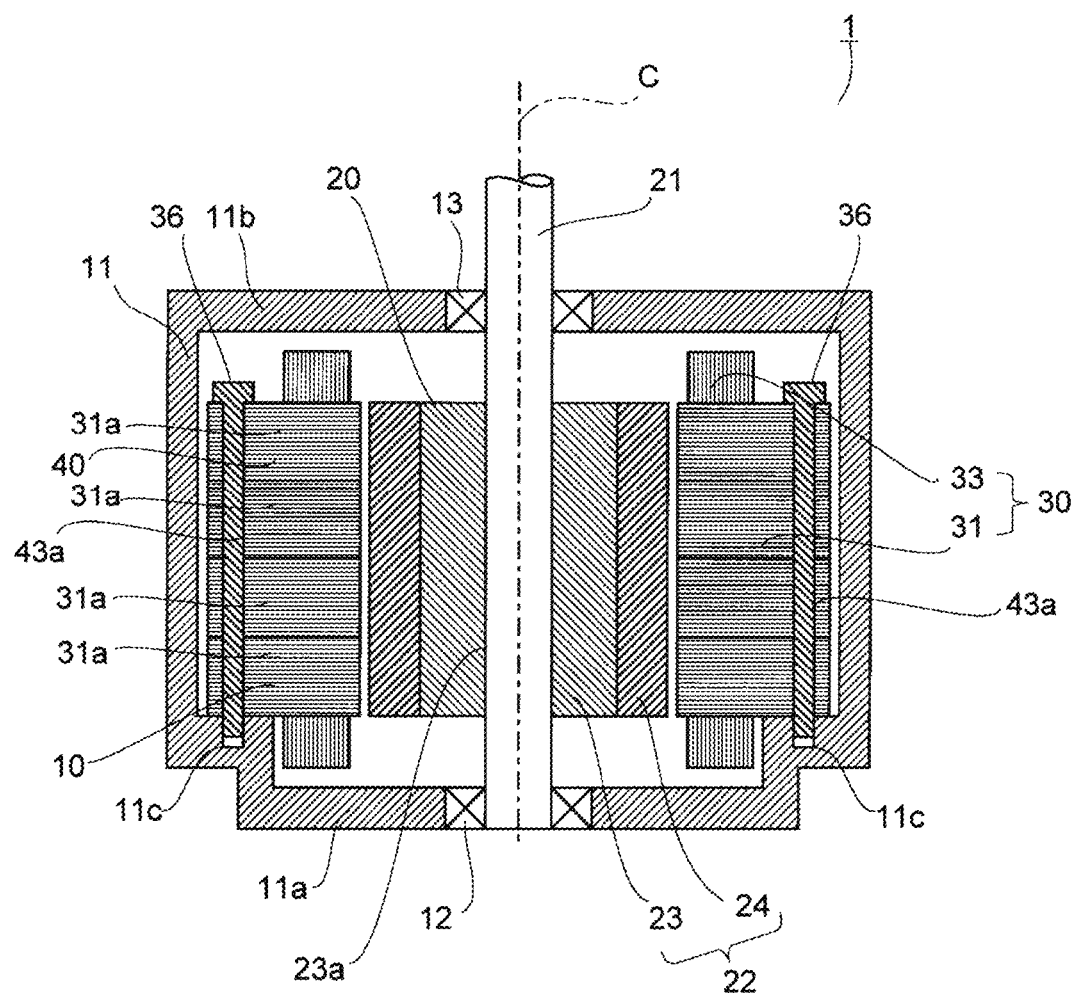
FIG. 1 is a vertical sectional view of a motor according to an example embodiment of the present disclosure.
Figure 2:
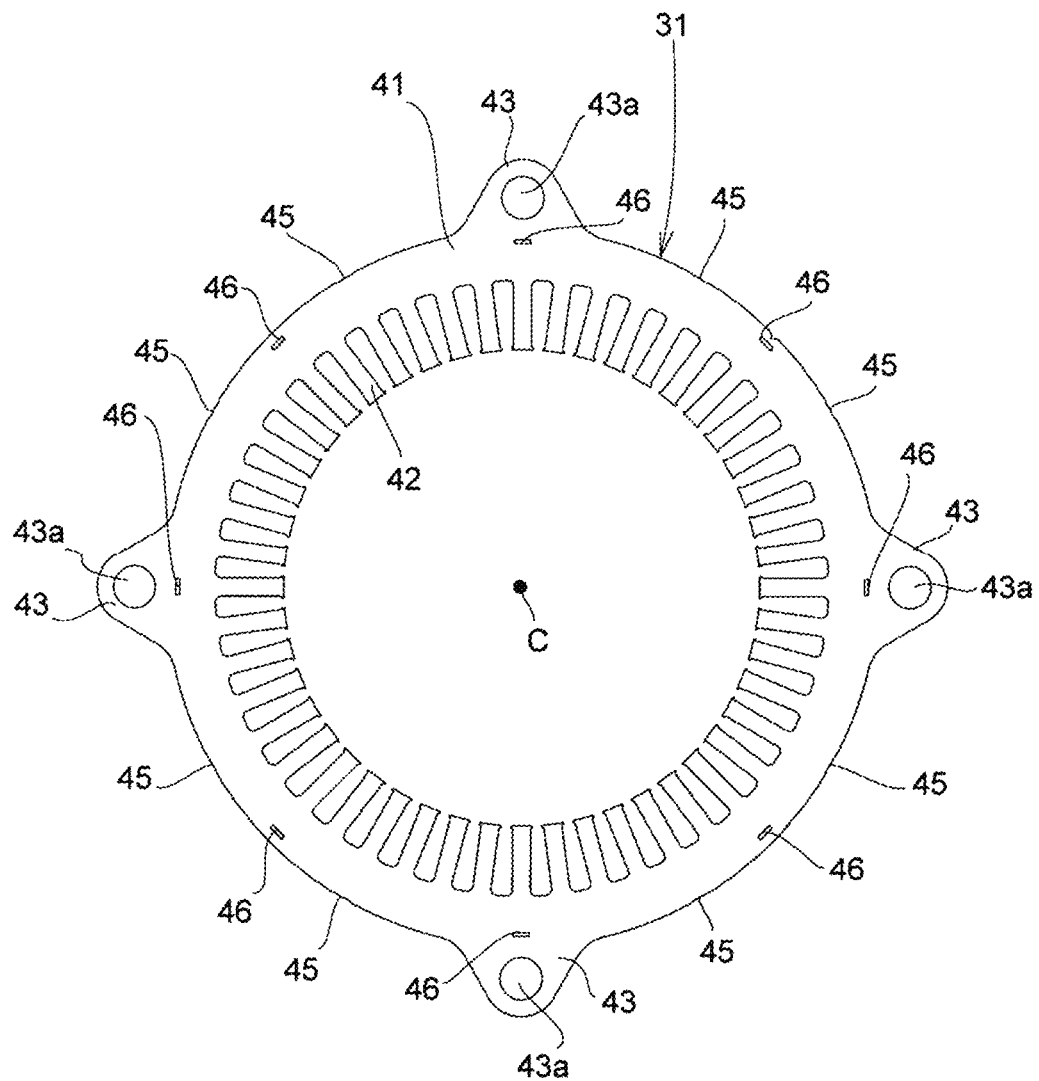
FIG. 2 is a top view of a stator core of the motor according to an example embodiment of the present disclosure.

A motor 1 according to an example embodiment of the present disclosure will now be described below. FIG. 1 is a vertical sectional view of the motor 1 according to an example embodiment of the present disclosure, and FIG. 2 is a top view of a stator core 31 of the motor 1.

The motor 1 includes a rotating portion 20 and a stationary portion 10. The rotating portion 20 includes a shaft 21 and a rotor 22. The shaft 21 is a columnar metal member arranged to rotate about a central axis C extending in the vertical direction.

The rotor 22 includes a rotor core 23 and a plurality of magnets 24. The rotor core 23 is defined by laminated steel sheets, which are annular electromagnetic steel sheets stacked in the axial direction. The rotor core 23 includes an insert hole 23a arranged to extend in the axial direction. The shaft 21 is press fitted into the insert hole 23a, and is fixed to the rotor core 23.

The magnets 24 are fixed to an outer circumferential surface of the rotor core 23 through, for example, an adhesive. A radially outer surface of each magnet 24 defines a pole surface arranged opposite to an inner circumferential surface of the stator core 31. The magnets 24 are arranged in a circumferential direction such that north poles and south poles alternate with each other. The rotor 22 is of a surface permanent magnet (SPM) type in the present example embodiment, but this is not essential to the present disclosure. For example, a rotor 22 of an interior permanent magnet (IPM) type, in which a rotor core 23 includes a plurality of magnet insert holes passing therethrough in the axial direction, and magnets 24 are inserted in the magnet insert holes, may alternatively be used. Alternatively, a rotor 22 including no magnet, which is used in an induction motor, a switched reluctance motor (SR motor), or the like, may be used.

The stationary portion 10 includes a housing 11 and a stator 30. The housing 11 is tubular, and is arranged to house the stator 30. The housing 11 includes a bottom plate portion 11a and a top plate portion 11b. The bottom plate portion 11a is arranged on an axially lower side of the stator 30 to hold a lower bearing 12. The top plate portion 11b is arranged on an axially upper side of the stator 30 to hold an upper bearing 13.

The lower bearing 12 and the upper bearing 13 are arranged to support the shaft 21 such that the shaft 21 is capable of rotating with respect to the housing 11. A ball bearing, for example, is used as each of the lower bearing 12 and the upper bearing 13.

The stator 30 is arranged radially outside of the rotor 22, and includes the stator core 31 and a plurality of coils 33. The stator core 31 is defined by a plurality of core blocks 31a stacked in the axial direction with rotation of the core blocks 31a relative to one another. Each core block 31a is defined by a plurality of core members 40 stacked in the axial direction. Each core member 40 is defined by an electromagnetic steel sheet in the shape of a circular ring. In a process of lamination, each core block 31a is rotated relative to the previous core block 31a in the present example embodiment, but this is not essential to the present disclosure. For example, in the process of lamination, each core member 40 may alternatively be rotated relative to the previous core member 40.

The stator core 31 includes a core back portion 41 in the shape of a circular ring, and a plurality of tooth portions 42 arranged to project radially inward from the core back portion 41. The core back portion 41 is arranged to be substantially coaxial with the central axis C. The tooth portions 42 are arranged at substantially regular intervals in the circumferential direction. In more detail, the number of tooth portions 42 is forty eight, and the stator core 31 is arranged to have 4-fold rotational symmetry.

The coils 33 are defined by conducting wires coated with an insulating coating and wound around the tooth portions 42 with a distributed winding. For example, two adjacent ones of the coils 33 define a coil group (not shown) for the same phase, and a coil group for a U phase, a coil group for a V phase, and a coil group for a W phase are arranged one after another repeatedly in the circumferential direction. In addition, the coil groups for the same phase are connected in series to make a round around the stator core 31.

Once an electric drive current is supplied to the coils 33, magnetic flux is generated around the tooth portions 42. Thus, a circumferential torque is produced between the tooth portions 42 and the magnets 24. As a result, the rotating portion 20 is caused to rotate about the central axis C with respect to the stationary portion 10. Magnetic lines of flux generated in each coil 33 travel radially outward through the corresponding tooth portion 42, and travel in the circumferential direction in an outer circumferential portion of the core back portion 41. The magnetic lines of flux traveling in the circumferential direction then travel radially inward through adjacent ones of the tooth portions 42.

As illustrated in FIG. 2, the core members 40, which define the stator core 31 and the core blocks 31a, are stacked in the axial direction through fixing portions 43, welding portions 45, and crimping portions 46. Each core member 40 includes an annular core back portion 41', and a plurality of tooth portions 42' arranged to project radially inward from an inner circumferential surface of the core back portion 41'. Each core member 40 is defined by a single monolithic member. Thus, the core back portion 41' of the core member 40 is defined in one piece with no circumferentially-joining joint.

Each fixing portion 43 is arranged to project radially outward from the core back portion 41'. The fixing portions 43 are arranged at four positions equally spaced from one another in the circumferential direction. Each fixing portion 43 includes a screw hole 43a arranged to pass therethrough in the axial direction. That is, the core back portion 41' includes a plurality of screw holes 43a usable to join axially adjacent ones of the core members 40 by screwing.

The screw holes 43a of the respective core blocks 31a are arranged to coincide when viewed in the axial direction, allowing bolts 36 (see FIG. 1) to be inserted through the screw holes 43a to be fastened into fixing holes 11c (see FIG. 1) defined in the bottom plate portion 11a. The stator core 31 and the housing 11 are thus fixed to each other. The stator core 31 can be securely fixed to the housing 11 with the fixing portions 43 being arranged at regular intervals in the circumferential direction. In addition, each core block 31a is arranged to have 4-fold rotational symmetry, with the fixing portions 43 being arranged at four positions. This arrangement allows the core blocks 31a to be stacked with each core block 31a being rotated by degrees in the circumferential direction relative to the previous core block 31a.

The crimping portions 46 are arranged in an outer circumferential portion of the core back portion 41'. That is, the screw holes 43a are arranged radially outward of the crimping portions 46. The crimping portions 46 are arranged at eight positions equally spaced from one another in the circumferential direction. The crimping portions 46 at four positions are arranged in the middle between adjacent ones of the screw holes 43a in the circumferential direction. Meanwhile, the crimping portions 46 at the other four positions are arranged radially inside of and opposite to the corresponding screw holes 43a.

Each crimping portion 46 is arranged to protrude on one side of the core member 40 and to be recessed on an opposite side of the core member 40. Axially adjacent ones of the core members 40 are fitted to each other through male-female fitting of the crimping portions 46. Thus, the axially adjacent core members 40 can be joined to each other by crimping.

The welding portions 45 are arranged on an outer circumferential surface of the core back portion 41', and are arranged at eight positions spaced from one another in the circumferential direction. In addition, the welding portions 45 and the crimping portions 46 are arranged to alternate with each other in the circumferential direction. The welding portions 45 are usable to join axially adjacent ones of the core members 40 by welding. That is, the core members 40 defining each core block 31a are joined together through the welding portions 45. Thus, in each core block 31a, axially adjacent ones of the core members 40 can be firmly joined to each other. In addition, adjacent ones of the core blocks 31a are also joined to each other through the welding portions 45.

In addition, the core members 40 are joined to one another more firmly with both the crimping portions 46 and the welding portions 45 being used to join the core members 40 to one another. Furthermore, with the welding portions 45 and the crimping portions 46 being arranged alternately in the circumferential direction, the core members 40 are firmly joined to one another while being stable in the circumferential direction.

Each welding portion 45 is arranged between adjacent ones of the screw holes 43a in the circumferential direction. In addition, the crimping portions 46 are greater in number than the screw holes 43a, and the shortest distance between adjacent ones of the welding portions 45 and the screw holes 43a is longer than the shortest distance between adjacent ones of the welding portions 45 and the crimping portions 46. Thus, the core members 40 are more firmly joined to one another while being stable in the circumferential direction.

Figure 3:
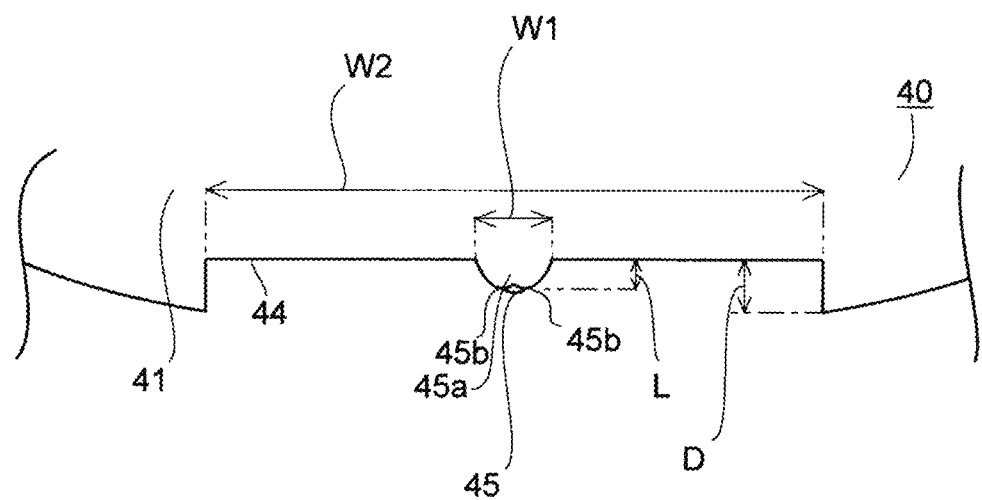
FIG. 3 is a top view illustrating a welding portion of the motor according to an example embodiment of the present disclosure in an enlarged form.

FIG. 3 is a top view illustrating one of the welding portions 45 in an enlarged form. The welding portion 45 is arranged at a recessed portion 44 recessed radially inward from the outer circumferential surface of the core back portion 41'. The welding portion 45 is usable to weld the core member 40 through, for example, arc welding or spot welding.

The extent D to which the recessed portion 44 is recessed in a radial direction is in the range of 0.2 mm to 1.5 mm both inclusive. Arranging the extent D of the recess to be 0.2 mm or more contributes to preventing the welding portion 45 from protruding radially outward relative to the outer circumferential surface of the core back portion 41'. Thus, a reduction in escape of magnetic lines of flux traveling in the circumferential direction in the outer circumferential portion of the core back portion 41' toward the housing 11 through the welding portion 45 can be achieved. A reduction in a magnetic flux loss can thus be achieved.

In addition, arranging the extent D of the recess to be 1.5 mm or less contributes to maintaining a sufficient radial width of the core back portion 41'. This in turn contributes to reducing narrowing of a magnetic path extending in the circumferential direction and formed on the core back portion 41' due to the recessed portion 44.

The core back portion 41' includes projecting portions 45a each of which is arranged to project radially outward from an inside wall surface of the corresponding recessed portion 44. Each welding portion 45 is formed on an outer circumferential surface of the corresponding projecting portion 45a. At this time, the extent L to which the projecting portion 45a projects in the radial direction is equal to or smaller than a half of the extent D of the recess. This contributes to preventing the welding portion 45 from protruding radially outward relative to the outer circumferential surface of the core back portion 41'. In addition, reducing the extent L to which the projecting portion 45a projects leads to reducing the escape of magnetic lines of flux toward the housing 11 through the welding portion 45.

In addition, the projecting portion 45a is arranged at a circumferential middle of the recessed portion 44, and the projecting portion 45a is arranged to have a circumferential width W1 smaller than ⅔th of a circumferential width W2 of the recessed portion 44. Arranging the width W1 to be smaller than ⅔th of the width W2 contributes to preventing a welding position in arc welding from getting outside of the recessed portion 44. In addition, reducing the circumferential width of the projecting portion 45a leads to reducing the escape of magnetic lines of flux toward the housing 11 through the welding portion 45.

In addition, the projecting portion 45a is defined by, or includes, a plurality of crest portions 45b arranged adjacent to each other in the circumferential direction on an outer circumferential edge thereof when viewed in the axial direction, each crest portion 45b being arranged to project radially outward. This ensures that an arc will reach a gap between the crest portions 45b adjacent to each other in the arc welding, which contributes to more securely preventing a welding position in the arc welding from getting outside of the projecting portion 45a.

Figure 4:
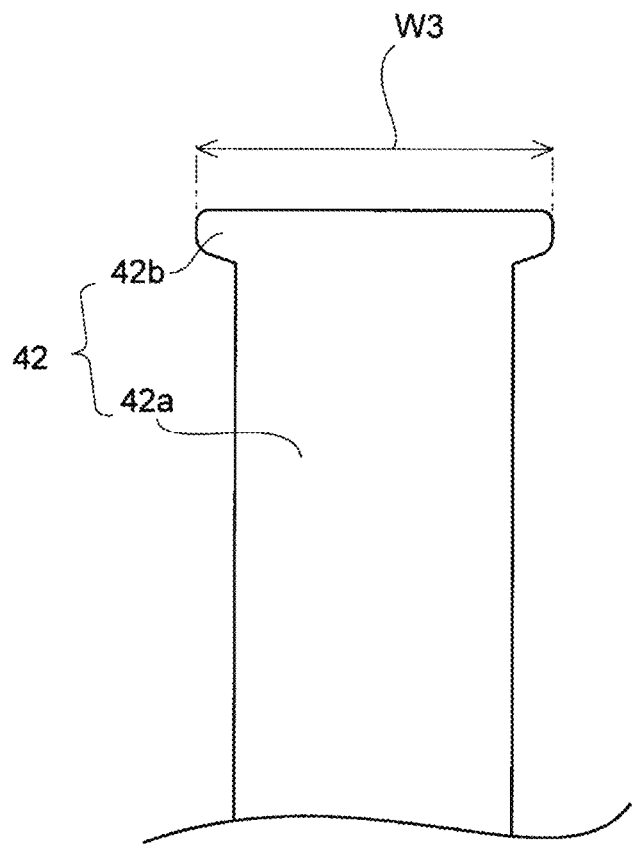
FIG. 4 is a top view illustrating a tooth portion of the motor according to an example embodiment of the present disclosure in an enlarged form.

FIG. 4 is a top view illustrating one of the tooth portions 42' in an enlarged form. The tooth portion 42' includes an extending portion 42a arranged to extend radially inward from the core back portion 41' (see FIG. 2), and an umbrella portion 42b arranged at a radially inner end of the extending portion 42a and arranged to extend therefrom to both sides in the circumferential direction. The circumferential width W2 of the recessed portion 44 is smaller than a circumferential width W3 of the umbrella portion 42b. This contributes to further reducing the narrowing of the magnetic path extending in the circumferential direction and formed on the core back portion 41' due to the recessed portion 44.

Note that only some of the core members 40 adjacent to each other may be welded together to produce the core block 31a. Also note that the core members 40 defining each core block 31a may be joined together through only the crimping portions 46, with only adjacent ones of the core blocks 31a being joined to each other through the welding portions 45. That is, in this case, the core members 40 include the core blocks 31a, each of which is defined by two or more of the core members 40 joined together through the crimping portions 46, while axially adjacent ones of the core blocks 31a are joined to each other through the welding portions 45. This reduces the number of welding processes to be performed, making it easier to produce the stator core 31. Example embodiments of the present disclosure are applicable to motors for use in vehicles.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A stator core, comprising:
    a plurality of plate-shaped core members laminated to define the stator core; wherein
    each of the core members includes:
        an annular core back portion; and
        a plurality of tooth portions projecting radially inward from an inner circumferential surface of the core back portion;
    the core back portion includes:
        at least one recessed portion recessed radially inward from an outer circumferential surface of the core back portion; and
        at least one welded portion arranged at a corresponding one of the at least one recessed portion to join axially adjacent ones of the core members;
    the at least one recessed portion is recessed in a radial direction in a range of about 0.2 mm to about 1.5 mm, both inclusive;
    the core back portion includes at least one projecting portion that projects radially outward from an inside wall surface of the corresponding one of the at least one recessed portion; and
    the at least one projecting portion includes a plurality of crest portions arranged adjacent to each other in a circumferential direction on an outer circumferential edge thereof when viewed in an axial direction, each of the crest portions projecting radially outward.

2. The stator core according to claim 1, wherein the core back portion is defined as a single monolithic piece with no circumferentially-joining joint.

3. The stator core according to claim 2, wherein
an extent to which the at least one projecting portion projects in the radial direction is equal to or smaller than a half of an extent to which the corresponding one of the at least one recessed portion is recessed in the radial direction.

4. The stator core according to claim 3, wherein
the at least one projecting portion is arranged at a circumferential middle of the corresponding recessed portion; and
the at least one projecting portion has a circumferential width smaller than about 2/7th of a circumferential width of the corresponding one of the at least one recessed portion.

5. The stator core according to claim 1, wherein
an extent to which the at least one projecting portion projects in the radial direction is equal to or smaller than a half of an extent to which the corresponding one of the at least one recessed portion is recessed in the radial direction.

6. The stator core according to claim 5, wherein
the at least one projecting portion is arranged at a circumferential middle of the corresponding one of the at least one recessed portion; and
the at least one projecting portion has a circumferential width smaller than about 2/7th of a circumferential width of the corresponding one of the at least one recessed portion.

7. The stator core according to claim 1, wherein
the core back portion includes a plurality of screw holes that joins axially adjacent ones of the core members via screws; and
the at least one welded portion is located between adjacent ones of the screw holes in a circumferential direction.

8. The stator core according to claim 1, wherein
the core back portion further includes a plurality of crimping portions that joins axially adjacent ones of the core members by crimping;
the at least one welded portion includes a plurality of welded portions; and
the crimping portions and the welded portions are arranged to alternate with each other in a circumferential direction.

9. The stator core according to claim 1, wherein
the core back portion includes:
at least one screw hole that joins axially adjacent ones of the core members via screws; and
at least one crimping portion that joins axially adjacent ones of the core members by crimping; and
the at least one crimping portion is arranged radially inward of the at least one screw hole.

10. The stator core according to claim 9, wherein
the at least one crimping portion is greater in number than the at least one screw hole; and
a shortest distance between adjacent ones of the at least one welded portion and the at least one screw hole is longer than a shortest distance between adjacent ones of the at least one welded portion and the at least one crimping portion.

11. The stator core according to claim 1, wherein
the core back portion includes at least one crimped portion that joins axially adjacent ones of the core members;
the core members include core blocks each of which is defined by two or more of the core members joined together through the at least one crimped portion; and
axially adjacent ones of the core blocks are joined to each other through the welded portions.

12. The stator core according to claim 11, wherein the two or more core members defining each core block are joined together through the welded portions.

13. The stator core according to claim 1, wherein
each of the tooth portions includes:
an extending portion that extends radially inward from the core back portion; and
an umbrella portion that extends from a radially inner end of the extending portion to both sides in a circumferential direction; and
the at least one recessed portion has a circumferential width smaller than a circumferential width of the umbrella portion.

14. A motor, comprising:
a stator core, including a plurality of plate-shaped core members laminated to define the stator core; wherein
each of the core members includes:
an annular core back portion; and
a plurality of tooth portions projecting radially inward from an inner circumferential surface of the core back portion;
the core back portion includes:
at least one recessed portion recessed radially inward from an outer circumferential surface of the core back portion; and
at least one welded portion arranged at a corresponding one of the at least one recessed portion to join axially adjacent ones of the core members;
the at least one recessed portion is recessed in a radial direction in a range of about 0.2 mm to about 1.5 mm, both inclusive;
the core back portion includes at least one projecting portion that projects radially outward from an inside wall surface of the corresponding one of the at least one recessed portion; and
the at least one projecting portion includes a plurality of crest portions arranged adjacent to each other in circumferential direction on an outer circumferential edge thereof when viewed in an axial direction, each of the crest portions projecting radially outward.

* * * * *